(12) United States Patent
Lim et al.

(10) Patent No.: US 11,511,532 B2
(45) Date of Patent: Nov. 29, 2022

(54) VEHICLE SEATBACK COVER AND MANUFACTURING METHOD THEREOF

(71) Applicant: LG Hausys, Ltd., Seoul (KR)

(72) Inventors: Sung Chan Lim, Seoul (KR); Seunghyun Ahn, Seoul (KR); Kyungseok Han, Seoul (KR); Jiwon Lim, Seoul (KR); Heejune Kim, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 17/097,748

(22) Filed: Nov. 13, 2020

(65) Prior Publication Data
US 2021/0146674 A1 May 20, 2021

(30) Foreign Application Priority Data

Nov. 15, 2019 (KR) .................. 10-2019-0146632
Oct. 27, 2020 (KR) .................. 10-2020-0139941

(51) Int. Cl.
| | |
|---|---|
| B32B 37/18 | (2006.01) |
| D04H 3/153 | (2012.01) |
| B32B 37/10 | (2006.01) |
| B32B 7/12 | (2006.01) |
| B32B 5/02 | (2006.01) |
| B60N 2/58 | (2006.01) |
| B32B 37/12 | (2006.01) |

(52) U.S. Cl.
CPC .............. *B32B 37/18* (2013.01); *B32B 5/022* (2013.01); *B32B 7/12* (2013.01); *B32B 37/10* (2013.01); *B32B 37/12* (2013.01); *B60N 2/5891* (2013.01); *D04H 3/153* (2013.01); *B32B 2605/003* (2013.01); *D10B 2505/12* (2013.01)

(58) Field of Classification Search
CPC ........... B32B 37/18; B32B 5/022; B32B 7/12; B32B 37/10; B32B 37/12; B32B 2605/003; B60N 2/5891; D04H 3/153; D10B 2505/12
See application file for complete search history.

(56) References Cited

U.S. PATENT DOCUMENTS

| | | | | |
|---|---|---|---|---|
| 6,060,145 A | * | 5/2000 | Smith | ........................ B32B 5/06 428/95 |
| 2019/0169380 A1 | * | 6/2019 | Maekawa | ................ C08J 5/046 |
| 2019/0248105 A1 | * | 8/2019 | Mondelaers | ............ B32B 5/024 |

FOREIGN PATENT DOCUMENTS

KR  10-2013-0053542 A  5/2013

* cited by examiner

Primary Examiner — Vishal I Patel
(74) Attorney, Agent, or Firm — Hauptman Ham, LLP

(57) ABSTRACT

The present disclosure relates to a manufacturing method of a vehicle seatback cover, comprising a lightweight composite manufacturing step of manufacturing a lightweight composite using a reinforcing fiber and a thermoplastic resin fiber, a lightweight composite forming step of forming the lightweight composite into a vehicle seatback cover shape and preparing a vehicle seatback cover material, and a carpet bonding step of bonding the vehicle seatback cover material and a carpet material.

11 Claims, 8 Drawing Sheets

FIG. 8

| Sample | Products | | | | Board | | | |
|---|---|---|---|---|---|---|---|---|
| | Comparative example 1 | Comparative example 2 | Comparative example 3 | Embodiment | Comparative example 1 | Comparative example 2 | Comparative example 3 | Embodiment |
| Average Thickness (mm) | 2.28 | 1.85 | 1.86 | 1.83 | 1.18 | 1.15 | 1.03 | 0.97 |
| #1 | 64 | 79 | 91 | 83 | 86 | 88 | 96 | 0.97 |
| #2 | 63 | 76 | 92 | 81 | 87 | 89 | 95 | 91 |
| #3 | 66 | 80 | 90 | 84 | 85 | 89 | 96 | 92 |
| #4 | 61 | 84 | 87 | 78 | 82 | 91 | 95 | 0.97 |
| #5 | 67 | 79 | 87 | 78 | 84 | 88 | 95 | 90 |
| Average | 64.2 | 79.6 | 89.4 | 80.8 | 84.8 | 89.0 | 95.4 | 0.97 |

FIG. 9

| Sample | | Thickness (mm) | | Strength (N) | | Modulus (MPa) | |
|---|---|---|---|---|---|---|---|
| | | MD | CD | MD | CD | MD | CD |
| Products | Comparative example 1 | 2.29 | 2.22 | 2.6 | 2.4 | 180 | 210 |
| | Comparative example 2 | 1.85 | 1.9 | 5.3 | 4.5 | 630 | 450 |
| | Comparative example 3 | 1.86 | 1.92 | 11.8 | 8.8 | 970 | 730 |
| | Embodiment | 1.83 | 1.8 | 7.2 | 5.1 | 660 | 460 |
| Board | Comparative example 1 | 1.24 | 1.06 | 4.3 | 2.5 | 1120 | 840 |
| | Comparative example 2 | 1.15 | 1.17 | 6.2 | 5.6 | 2000 | 1660 |
| | Comparative example 3 | 1.03 | 1.06 | 6.4 | 5.5 | 2320 | 2080 |
| | Embodiment | 0.97 | 1.04 | 6.2 | 3.8 | 2600 | 1430 |

…

VEHICLE SEATBACK COVER AND MANUFACTURING METHOD THEREOF

CROSS-REFERENCE TO RELATED APPLICATION

This application claims priority to and the benefit of Korean Patent Application No. 10-2019-0146632 filed in Korea on Nov. 15, 2019, and Korean Patent Application No. 10-2020-0139941 filed in Korea on Oct. 27, 2020, the disclosure of which is incorporated herein by reference in its entirety.

TECHNICAL FIELD

Disclosed herein are a vehicle seatback cover and a manufacturing method thereof.

BACKGROUND

A vehicle seatback of the related art comes without a cover or with a cover including a hard material such as woodstock and the like.

Without a vehicle seatback cover, a carpet used as a finish material can be torn. Additionally, a cover including a hard material such as woodstock and the like can cause an increase in a product's weight while ensuring rigidity.

If a relatively light plastic material is used for a vehicle seatback cover, a product can become lightweight but hardly ensure required physical properties.

Against this backdrop, there is a growing need for a vehicle seatback cover and a manufacturing method thereof manufactured using a material having a more excellent strength and rigidity and allowing of a more lightweight product than a hard material such as woodstock and the like that has been widely used.

A frame integrated seatback cover for a vehicle is disclosed in Korean Patent Publication No. 10-2013-0053542 (published on May 24, 2013) as a prior art document.

SUMMARY

The present disclosure is directed to a vehicle seatback cover using a lightweight composite that may allow of a lightweight product and improve physical properties of a product unlike a material (e.g., woodstock and the like) of the related art.

The present disclosure is also directed to a manufacturing method of a vehicle seatback cover using a lightweight composite that may allow of a lightweight product and improve physical properties of a product unlike a material of the related art.

Objectives are not limited to the above ones, and other objectives and advantages that have not been mentioned can be clearly understood from the following description and can be more clearly understood from the embodiments set forth herein. Further, the aspects and advantages can be realized via means and combinations thereof in the appended claims.

According to one aspect, a manufacturing method of a vehicle seatback cover that may use a lightweight composite different from a material used for a vehicle seatback cover of the related art, thereby ensuring a lightweight feature and improving physical properties.

The manufacturing method of a vehicle seatback cover according to one embodiment may include a lightweight composite manufacturing step of manufacturing a lightweight composite using a reinforcing fiber and a thermoplastic resin fiber, a lightweight composite forming step of forming the lightweight composite into a vehicle seatback cover shape and preparing a vehicle seatback cover material, and a carpet bonding step of bonding the vehicle seatback cover material and a carpet material.

The lightweight composite may include a dry laid composite (DLC) material. DLC may be one of the lightweight composites. When a porous composite material such as a DLC material is used instead of a hard material such as woodstock and the like having rigidity, a lightweight feature, and an excellent strength and an excellent rigidity may be ensured.

The lightweight composite may use maleic anhydride modified polypropylene (MAPP) as a raw material. MAPP denotes a maleic anhydride (MA)-grafted polypropylene. MAPP has an excellent rigidity in itself, and complements hardness with respect the same mass. Additionally, MA in MAPP may excellently interact with a reinforcing fiber, thereby effectively improving a flexural property, e.g., flexural strength. The lightweight composite manufacturing step may include a fiber supplying step of supplying a reinforcing fiber and a thermoplastic resin fiber respectively, an opening step of opening the supplied reinforcing fiber and thermoplastic resin fiber, a mixing step of receiving and mixing the opened reinforcing fiber and thermoplastic resin fiber, and a carding step of evenly dispersing and carding the mixed lightweight composite material.

The lightweight composite manufacturing step may further include a cross-lapping step of cross-lapping the carded lightweight composite material, while removing directionality of the carded lightweight composite material, and further stacking a nonwoven scrim on one side of the cross-lapped lightweight composite material, after the carding step.

The lightweight composite manufacturing step may further include a needle-punching step of needle-punching the cross-lapped lightweight composite material after the cross-lapping step.

The lightweight composite manufacturing step may further include a slitting step of cutting the needle-punched lightweight composite material into a predetermined shape and size after the needle-punching step, and a laminating step of laminating the lightweight composite material cut into the predetermined shape and size and providing a lightweight composite having a predetermined thickness.

The lightweight composite forming step may include primarily trimming the lightweight composite into a predetermined size and shape, heating the primarily trimmed lightweight composite at a predetermined temperature, pressing and secondarily trimming the heated lightweight composite, forming the same into a vehicle seatback cover shape, and providing a vehicle seatback cover material.

The carpet bonding step may include preparing a carpet material and trimming the carpet material into a shape and size of a vehicle seatback cover, forming a glue on the trimmed carpet material, and press-bonding the carpet material and the vehicle seatback cover material using the glue.

The carpet bonding step may further include edge-rapping an edge of the vehicle seatback cover using a remaining portion of an outer side of the carpet material bonded to the vehicle seatback cover material.

According to another aspect, provided is a vehicle seatback cover manufactured according to the manufacturing method of a vehicle seatback cover.

The vehicle seatback cover according to one embodiment may include a vehicle seatback cover material formed using a lightweight composite, and a carpet material press-bonded to the vehicle seatback cover material, wherein the lightweight composite may include a DLC material.

The lightweight composite may use maleic anhydride modified polypropylene (MAPP) as a raw material. MAPP denotes a maleic anhydride (MA)-grafted polypropylene. MAPP has an excellent rigidity in itself, and complements hardness with respect the same mass. Additionally, MA in MAPP may excellently interact with a reinforcing fiber, thereby effectively improving a flexural property, e.g., a flexural strength.

The lightweight composite may have a Shore A Hardness of 89 to 92.

The lightweight composite may have a flexural strength of 3.8 to 6.2, and a flexural modulus of 1430 to 2600.

According to the present disclosure, a vehicle seatback cover may be manufactured using a lightweight composite. The vehicle seatback cover manufactured using a lightweight composite may weigh less and have more excellent mechanical properties such as strength, rigidity and the like than the vehicle seatback cover manufactured using a material of the related art (e.g., woodstock and the like).

According to the present disclosure, a vehicle seatback cover, which is lightweight and has an excellent strength and rigidity, may be manufactured using a lightweight composite. Thus, while a vehicle seatback cover of the related art comes without a cover to make the vehicle seatback cover lighter, the vehicle seatback cover manufactured using a lightweight composite may have the advantage of protecting a surface carpet and ensuring improvement in durability and maintaining quality.

Specific effects are described together with the above-described effects in the section "Detailed Description.

BRIEF DESCRIPTION OF DRAWINGS

The accompanying drawings constitute a part of this specification, illustrate one or more embodiments of the present disclosure, and together with the specification, explain the present disclosure, wherein:

FIG. 8 is a table showing a result of a Shore A Hardness test in an embodiment using MAPP as a raw material and in comparative examples; and FIG. 9 is a table showing a result of a flexural property test in an embodiment using MAPP as a raw material and in comparative examples.

DETAILED DESCRIPTION

Figure 1:
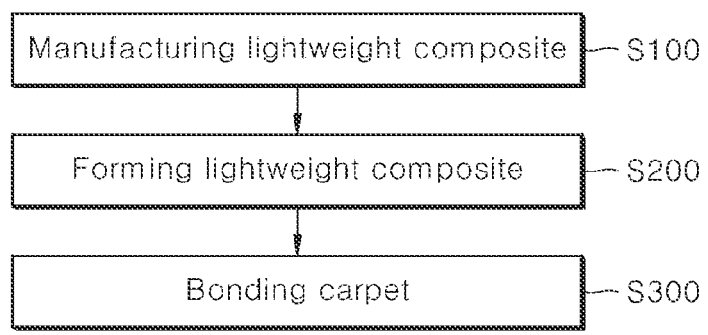
FIG. 1 is a flow chart briefly showing a manufacturing method of a vehicle seatback cover according to one embodiment.

Below, embodiments are described with reference to the accompanying drawings such that one having ordinary skill in the art is easily implement the embodiments in the disclosure. Embodiments, however, can be implemented in various different forms, and should not be construed as being limited only to the embodiments set forth herein.

For clarity of the disclosure, description of details irrelevant to the disclosure can be omitted if it is deemed to make the gist of the disclosure unnecessarily vague. Throughout the disclosure, identical reference numerals denote identical or similar components. Additionally, some embodiments set forth in the disclosure are specifically described with reference to the accompanying drawings. Identical components in each of the drawings can be given like reference numerals although they are illustrated in a different drawing. Further, in the disclosure, description of the well-known functions and configurations in relation to the disclosure can be omitted if it is deemed to make the gist of the disclosure unnecessarily vague.

It should be understood that the terms "first", "second", "A" "B", "(a)", "(b)", and the like, are used herein only to distinguish one component from another component. Thus, the essence, array, order or number of the components is not limited by the terms. When one component is described as being "connected", "coupled", or "connected" to another component, one component may be directly connected or directly coupled to another component; however, it is also to be understood that an additional component may be "interposed" between the two components, or the two components may be "connected", or "coupled" through an additional component.

In implementing the embodiments, components can be segmented and described for convenience. However, the components may be implemented in one device or module, or one component may be divided and implemented into two or more devices or modules.

Manufacturing Method of Vehicle Seatback Cover

FIG. 1 is a flow chart briefly showing a manufacturing method of a vehicle seatback cover according to one embodiment.

Referring to FIG. 1, the manufacturing method of a vehicle seatback cover according to one embodiment may include a lightweight composite manufacturing step (S100), a lightweight composite forming step (S200), and a carpet bonding step (S300).

In the lightweight composite manufacturing step (S100), a lightweight composite may be manufactured using a reinforcing fiber (e.g., a glass fiber and the like) and a thermoplastic resin fiber (e.g., a polypropylene (PP) fiber and the like). The lightweight composite 10 (see FIG. 5) is more lightweight than a material (e.g., woodstock and the like) for a vehicle seatback cover material of the related art, and has excellent mechanical properties such as strength, rigidity and the like. For example, a dry laid composite (DLC) material may be used as the lightweight composite 10 (see FIG. 5).

For example, maleic anhydride modified polypropylene (MAPP) may be used as a raw material for the lightweight composite. MAPP denotes a maleic anhydride (MA)-grafted polypropylene. MAPP has an excellent rigidity in itself, and complements hardness with respect to the same mass. Additionally, MA in MAPP may excellently interact with a reinforcing fiber, thereby effectively improving a flexural property, e.g., a flexural strength.

The lightweight composite using MAPP as a raw material may have a Shore A Hardness of 89 to 92.

Further, the lightweight composite may have a flexural strength of 3.8 to 6.2 and a flexural modulus of 1430 to 2600.

Then in the lightweight composite forming step (S200), the lightweight composite 10 (see FIG. 5) manufactured in the previous step (S100) may be formed into a shape corresponding to a shape of a product i.e., a vehicle seatback cover. Through the lightweight composite forming step (S200), a material for a vehicle seatback cover 20 (see FIG. 5), which is more lightweight than a material of the related art and has excellent strength and rigidity, may be prepared. That is, the lightweight composite forming step (S200) may denote forming the lightweight composite 10 (see FIG. 5) into a predetermined shape to form a vehicle seatback cover material 20 (see FIG. 5).

Figure 7:
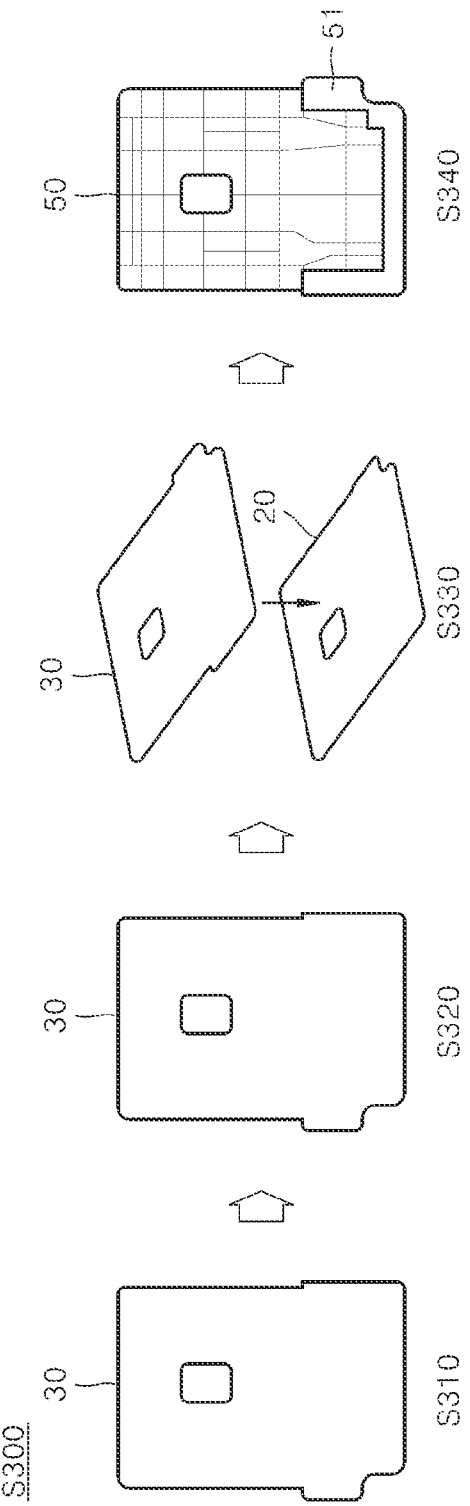
FIG. 7 is a process chart for describing a carpet bonding step according to an embodiment.

Then in the carpet bonding step (S300), a carpet material 30 (see FIG. 7) is prepared, and trimmed to correspond to the shape of the vehicle seatback cover. The trimmed carpet material 30 (see FIG. 7), and the vehicle seatback cover material 20 (see FIG. 5) made of the lightweight composite material manufactured in the previous step (S200) may be attached and press-bonded and edge-wrapped to manufacture a vehicle seatback cover 50 (FIG. 7).

Below, the lightweight composite manufacturing step (S100), the lightweight composite forming step (S200), and the carpet bonding step (S300) are described with reference to the accompanying drawings.

Manufacturing of Lightweight Composite

The lightweight composite manufacturing step (S100) may denote manufacturing a lightweight composite using a reinforcing fiber and a thermoplastic resin fiber.

The lightweight composite, manufactured in step 100, may denote a material that is more lightweight than a material for a vehicle seatback cover material of the related art (e.g., woodstock and the like) and has excellent mechanical properties such as strength, rigidity and the like For example, in the disclosure, a DLC material may be used as the lightweight composite.

Figure 2:
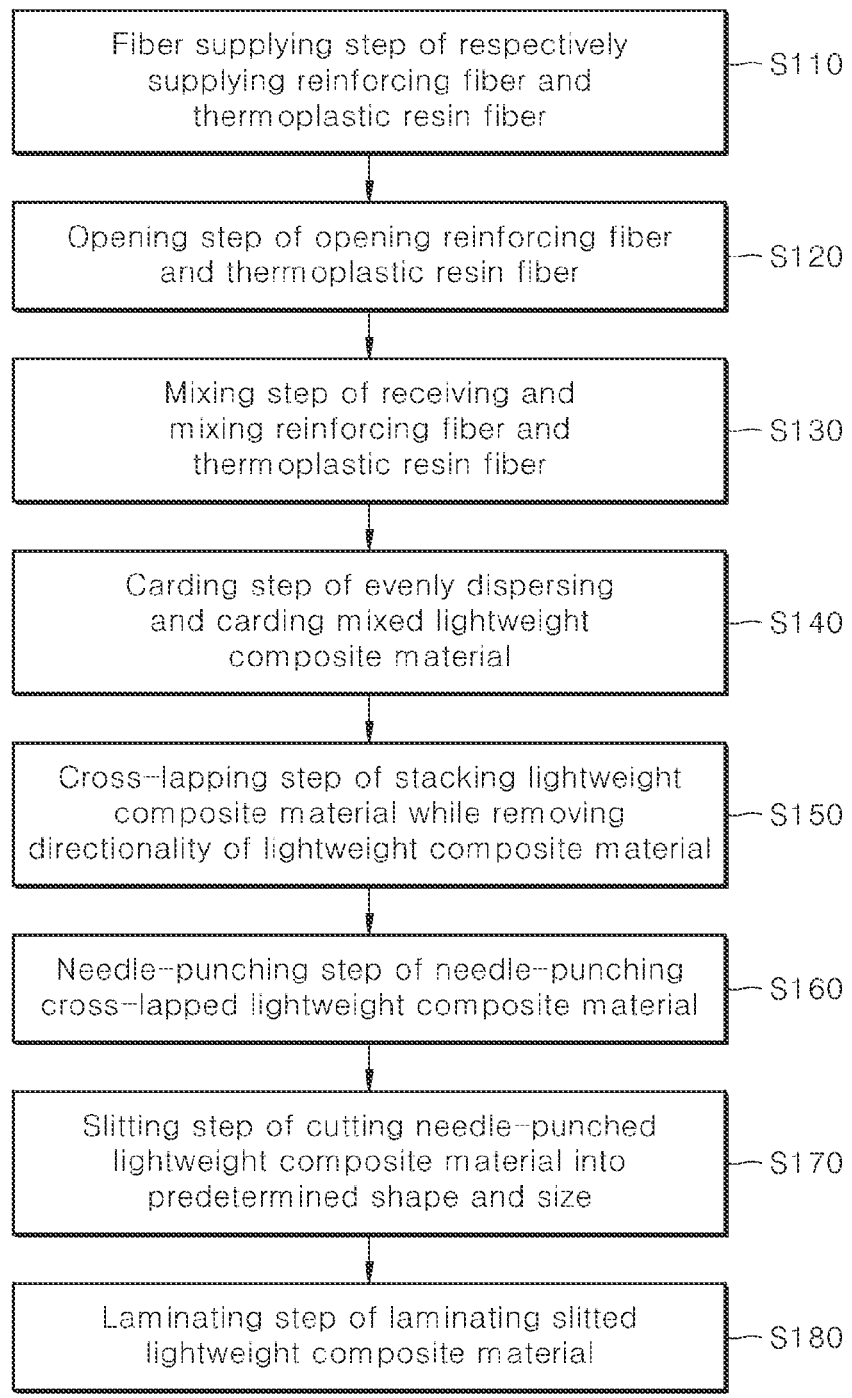
FIG. 2 is a flow chart briefly showing a lightweight composite manufacturing step in a manufacturing method of a vehicle seatback cover according to one embodiment.

Below, a manufacturing method of the lightweight composite in the disclosure, i.e., the DLC material, is described with reference to FIGS. 2 and 3. FIG. 2 is a flow chart briefly showing a lightweight composite manufacturing step, and FIG. 3 is a process chart for describing a lightweight composite manufacturing step.

The step (S100) of manufacturing a lightweight composite (i.e., a DLC material) may include a fiber supplying step (S110), an opening step (S120), a mixing step (S130), a carding step (S140), a cross-lapping step (S150), a needle-punching step (S160), a slitting step (S170), and a laminating step (S180).

In the fiber supplying step (S110), a reinforcing fiber and a thermoplastic resin fiber may be respectively supplied. The reinforcing fiber may include one or more selected from a group comprised of a polyester fiber, a glass fiber, a basalt fiber, a carbon fiber, an aramid fiber and a combination thereof. The thermoplastic resin fiber may include one or more selected from a group comprised of an aromatic vinyl resin, a rubber-modified aromatic vinyl resin, a polyphenylenether resin, a polycarbonate resin, a polyester resin, a methacrylate resin, a polyarylenesulfide resin, a polyamide resin, a polyvinyl chloride resin, a polyolefin resin and a combination thereof.

Figure 3:
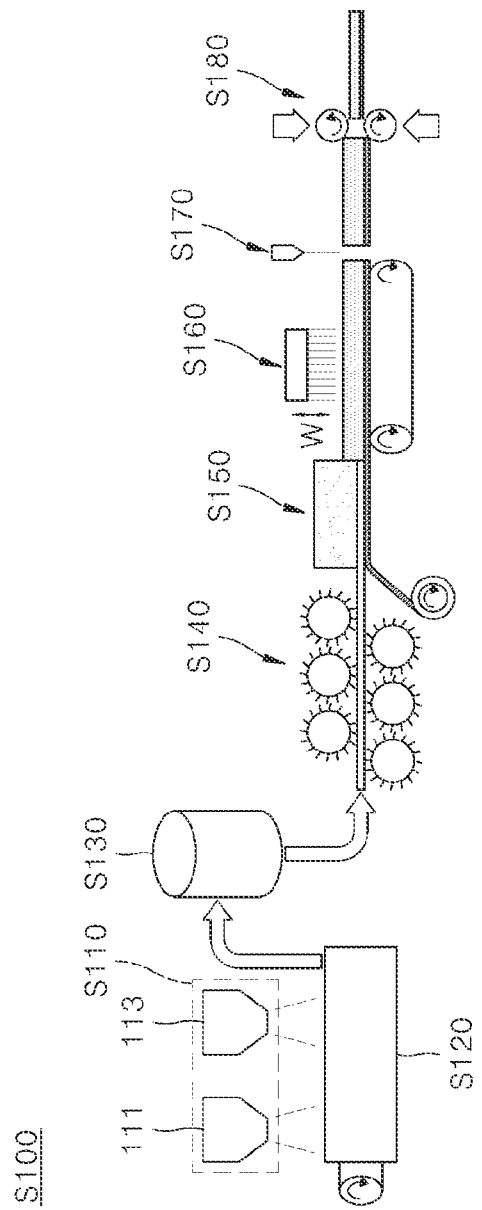
FIG. 3 is a process chart for describing a lightweight composite manufacturing step in a manufacturing method of a vehicle seatback cover according to one embodiment.

Referring to FIG. 3, a reinforcing fiber hopper 111 and a thermoplastic resin fiber hopper 113 may be used. The reinforcing fiber hopper 111 may receive and store a reinforcing fiber, and supply a predetermined amount of the reinforcing fiber according to a control signal of a user. Additionally, the thermoplastic resin fiber hopper 113 may receive and store a thermoplastic resin fiber, and supply a predetermined amount of the thermoplastic resin fiber according to a control signal of the user. In the drawing, the reinforcing fiber hopper 111 may be disposed in front of the thermoplastic resin fiber hopper 113. However, the position of the reinforcing fiber hopper 111 may be changed in many different ways apparent to one skilled in the art.

The opening step (S120) may denote opening of the reinforcing fiber and thermoplastic resin fiber. The opening step denotes untangling a bunch of raw materials firmly twisted round each other into fibers on a thin sheet.

The mixing step (S130) may denote being supplied with the opened reinforcing fibers and thermoplastic resin fibers and mixing them.

The carding step (S140) may denote evenly dispersing the mixed material (referred to as a lightweight composite material). The carding step may denote combing the fiber, i.e., a material for a mat, obtained through the opening and mixing steps to evenly disperse them.

The cross-lapping step (S150) may denote cross-lapping the lightweight composite material in multiple layers to eliminate directionality of the lightweight composite material that comes to have directionality in the carding step (S140).

In the cross-lapping step (S150), a nonwoven scrim may be further stacked on one surface of the lightweight composite material. The nonwoven scrim may be stacked in a lower layer of the cross-lapped lightweight composite material.

The needle-punching step (S160) may denote receiving the lightweight composite material having experienced the cross-lapping step (S150) and performing needle-punching. The needle-punching step may denote punching the material using a plurality of needles in an up-down direction.

The slitting step (S170) may denote receiving the lightweight composite material having experienced the needle-punching step (S160) and cutting the same into a predetermined shape and size.

In the laminating step (S180), a plurality of pressure rollers may face each other with respect to a path on which the lightweight composite material, cut into the predetermined shape and size, is transferred and may be disposed on an upper side and a lower side on the path, and the plurality of pressure rollers may manufacture a lightweight composite having a predetermined thickness while making a rotation.

Formation of Lightweight Composite

The lightweight composite forming step (S200) may denote forming a lightweight composite into a vehicle seatback cover shape and preparing a vehicle seatback cover material.

After a lightweight composite, e.g., a DLC material, having a predetermined thickness, is manufactured in the above lightweight composite manufacturing step (S100), the manufactured lightweight composite may be formed into the vehicle seatback cover shape in the lightweight composite forming step (S200). The lightweight composite formed into the vehicle seatback cover shape is referred to as a vehicle seatback cover material.

A step of forming a vehicle seatback cover material using the lightweight composite, i.e., a DLC material, in the disclosure is described with reference to FIGS. 4 and 5, hereunder.

Figure 4:
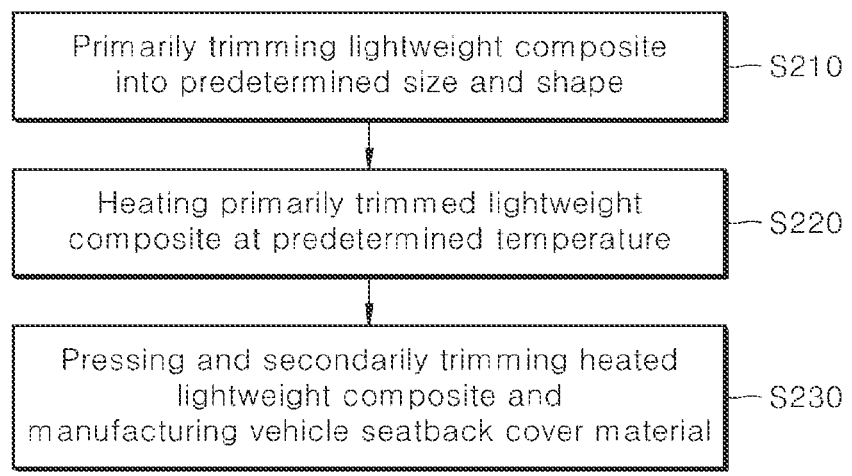
FIG. 4 is a flow chart briefly showing a lightweight composite forming step in a manufacturing method of a vehicle seatback cover according to one embodiment.
Figure 5:
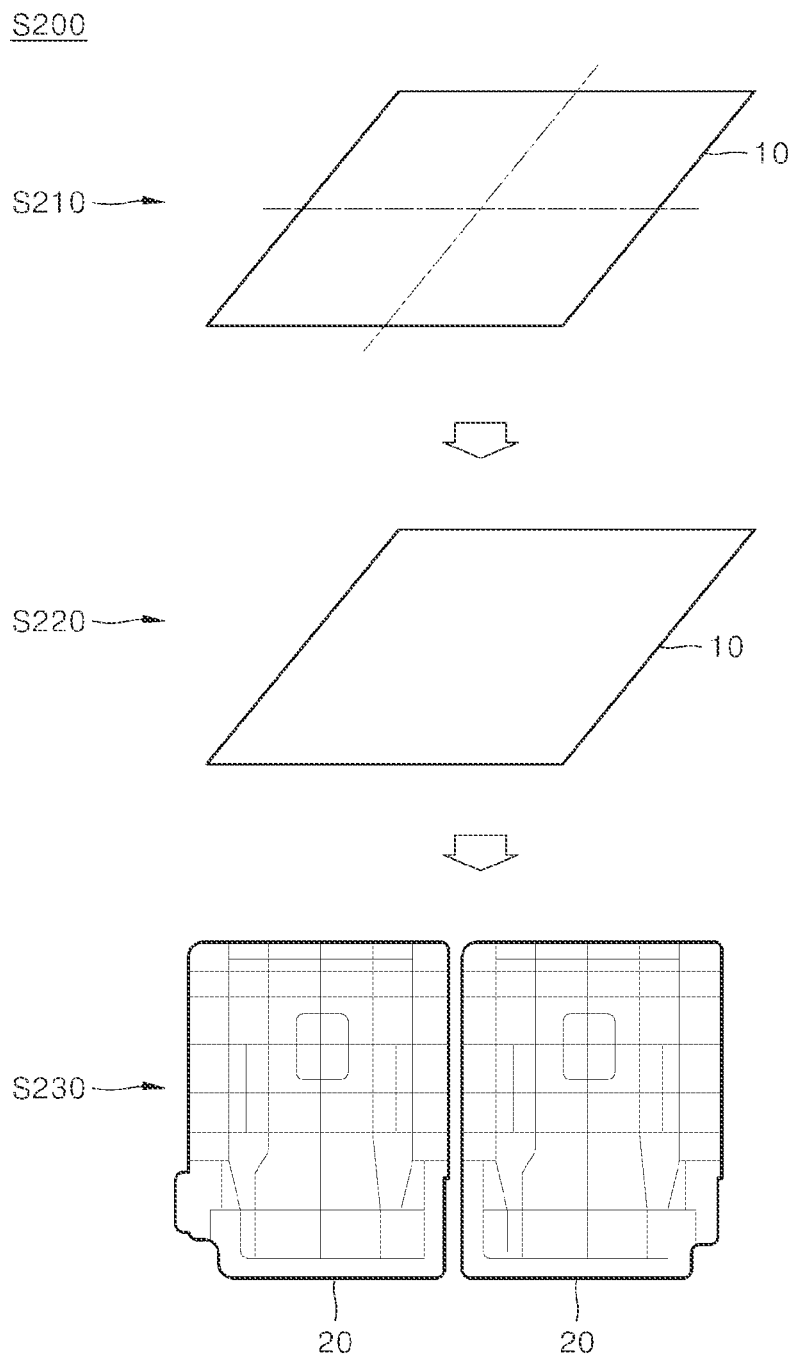
FIG. 5 is a process chart for describing a lightweight composite forming step according to one embodiment.

FIG. 4 is a flow chart briefly showing a lightweight composite forming step, and FIG. 5 is a process chart for describing a lightweight composite forming step.

Referring to FIGS. 4 and 5, the lightweight composite forming step (S200) may include a primary trimming step (S210), a heating step (S220), and a pressing process and a secondary trimming step (S230).

The primary trimming step (S210) may denote classifying a lightweight composite based on a size and shape appropriate for the formation of a vehicle seatback cover and cutting the same in advance before the pressing process. Referring to FIG. 5, a sheet-shaped lightweight composite 10, manufactured in the lightweight composite manufacturing step (S100; see FIG. 3) and having a predetermined thickness, may be prepared, and then may be cut along a predetermined trimming line (a one-dot chain line). As a result, the primary trimming step (S210) may be completed.

The heating step (S230) may denote heating the primarily trimmed lightweight composite 10 at a predetermined temperature. Referring to FIG. 5, the primarily trimmed lightweight composite 10 may be heated at the predetermined temperature before the pressing process which is performed later.

In the pressing process and the secondary trimming step (S230), the lightweight composite 10, heated at the predetermined temperature in the heating step (S230), may be put into a pressing device that performs press forming as a result of an up-down pressurization, and formed into a desired shape corresponding to a shape of the vehicle seatback cover. After the pressing process, unnecessary portions may be cut out and removed. This is referred to as a secondary trimming step. Through the step, a vehicle seatback cover material 20 using the lightweight material may be prepared as in FIG. 5.

Bonding of Carpet

The carpet bonding step (S300) may denote bonding the vehicle seatback cover material, using a lightweight composite and prepared through the lightweight composite forming step (S200), and a carpet.

A process of bonding the vehicle seatback cover material using the lightweight composite and a carpet is described with reference to FIGS. 6 and 7, hereunder.

Figure 6:
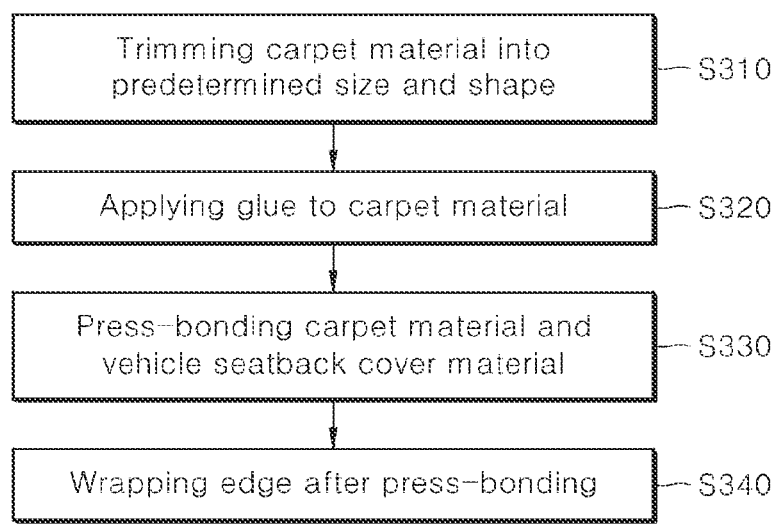
FIG. 6 is a flow chart briefly showing a carpet bonding step in a manufacturing method of a vehicle seatback cover according to one embodiment.

FIG. 6 is a flow chart briefly showing a carpet bonding step, and FIG. 7 is a process chart for describing a carpet bonding step.

Referring to FIGS. 6 and 7, the carpet bonding step (S300) may include a carpet trimming step (S310), a glue forming step (S320), a press-bonding step (S330), and an edge-wrapping step (S340).

The carpet trimming step (S310) may denote preparing a carpet material 30 and cutting the prepared carpet material into a shape and size appropriate for a vehicle seatback cover.

The glue forming step (S320) may denote forming a glue along a welded surface set on the carpet material 10 having experienced the carpet trimming step (S310). In this case, a method of forming the glue may include various types of methods such as an application, a spray and the like. In addition, a glue forming method apparent to one having ordinary skill in the art may be also adopted.

The press-bonding step (S330) may denote heating, pressing and bonding the carpet material 30, on which the glue is formed, and the vehicle seatback cover material 20 using the lightweight composite formed through the lightweight composite forming step (S200), with a pressing device exclusive for a vehicle seatback cover. In the step, the carpet material 30 and the vehicle seatback cover material 20 using the lightweight composite may be stacked, combine and integrated, and may be provided as a vehicle seatback cover 50.

In an embodiment, the edge-wrapping step (S340) may be further performed after the above press-bonding step (S330).

The edge-wrapping step (S340) may denote completing the bonding between the vehicle seatback cover material 20 including the lightweight composite, i.e., a DLC material, and the carpet material 30, and involve wrapping an edge 51 of the vehicle seatback cover 50 using a remaining portion of an outer side of the carpet material 30. As a result, improvement in aesthetic qualities of the appearance of the vehicle seatback cover 50 and durability of the vehicle seatback cover 50 may be ensured.

The vehicle seatback cover 50 manufactured using the manufacturing method of a vehicle seatback cover in the above-described embodiment may include the vehicle seatback cover material 20 formed into a vehicle seatback cover shape using a lightweight composite, and the carpet material 30 press-bonded to the vehicle seatback cover material 20. In this case, a DLC material may be used as the lightweight composite.

For example, maleic anhydride modified polypropylene (MAPP) may be used as a raw material for the lightweight composite. MAPP denotes a maleic anhydride (MA)-grafted polypropylene. MAPP has an excellent rigidity in itself, and complements hardness with respect the same mass. Additionally, MA in MAPP may excellently interact with a reinforcing fiber, thereby effectively improving a flexural property, e.g., a flexural strength.

Below, results of a Shore A Hardness test and a flexural property test in an embodiment using MAPP as a raw material and comparative examples are described as follows.

FIG. 8 is a table showing a result of a Shore A Hardness test in an embodiment using MAPP as a raw material and in comparative examples.

The Shore A Hardness test was conducted under the conditions of an A type durometer, an indentor size of Truncated Cone of ø0.79 with 35° angle, a load of 580 g and a specification of >55, by the ASTM D2240 standard, using the TECLOCK Durometer GS series.

In the embodiment, 600 g/m$^2$ (MAPP+GF 40 wt %, 550 g/m$^2$+Scrim 50 g/m$^2$) was used. Herein, the scrim was PET.

In comparative example 1, 600 g/m$^2$ (PP+GF 40 wt %, 550 g/m$^2$+Scrim 50 g/m$^2$), which was the same weight as in the embodiment, was used; in comparative example 2, 750 g/m$^2$ (PP+GF 40 wt %, 700 g/m$^2$+Scrim 50 g/m$^2$); in comparative example 3, 850 g/m$^2$ (PP+GF 40 wt %, 800 g/m$^2$+Scrim 50 g/m$^2$).

Referring to FIG. 8, the comparative example 1 and the embodiment were under the same basic weight conditions, i.e., 600 g/m$^2$. The embodiment using MAPP as a raw material had an improved rigidity in itself and a much higher Shore A Hardness than the comparative example 1 with respect to the same mass.

FIG. 9 is a table showing a result of a flexural property test in an embodiment using MAPP as a raw material and in comparative examples.

The flexural property test was conducted under the conditions of a sample size of 150×50 m, 2T, a load cell of 500 N, and a span length of 100 mm by the ASTM D790 standard, using the Instron 5969.

In the embodiment, 600 g/m$^2$ (MAPP+GF 40 wt %, 550 g/m$^2$+Scrim 50 g/m$^2$) was used. Herein, the scrim was PET.

In comparative example 1, 600 g/m$^2$ (PP+GF 40 wt %, 550 g/m$^2$+Scrim 50 g/m$^2$), which was the same weight as in the embodiment, was used; in comparative example 2, 750 g/m$^2$ (PP+GF 40 wt %, 700 g/m$^2$+Scrim 50 g/m$^2$); in comparative example 3, 850 g/m$^2$ (PP+GF 40 wt %, 800 g/m$^2$+Scrim 50 g/m$^2$).

Referring to FIG. 9, the comparative example 1 and the embodiment were under the same basic weight conditions, i.e., 600 g/m$^2$. However, the embodiment used MAPP as a raw material and the comparative example 1 used PP as a raw material. In this case, flexural properties, e.g., a flexural strength, of the embodiment were further improved than those of the comparative example 1 under the same basic weight conditions with the help of MA excellently interacting with a reinforcing fiber. Based on the above-described configuration and effect, a vehicle seatback cover using a lightweight composite may be manufactured.

The vehicle seatback cover manufactured using a lightweight composite may weigh less and have more excellent mechanical properties such as strength, rigidity and the like than the vehicle seatback cover manufactured using a material of the related art (e.g., woodstock and the like).

Further, a vehicle seatback cover using a lightweight composite, which becomes light and has excellent strength and rigidity, may be provided.

Thus, while a vehicle seatback cover of the related art comes without a cover to make the vehicle seatback cover lighter, the vehicle seatback cover manufactured using a lightweight composite may have the advantage of protecting a surface carpet and ensuring improvement in durability and maintaining quality.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure.

DESCRIPTION OF SYMBOLS

S100: Lightweight composite manufacturing step
S110: Fiber supplying step
S120: Opening step
S130: Mixing step
S140: Carding step
S150: Cross-lapping step
S160: Needle-punching step
S170: Slitting step
S180: Laminating step
S200: Lightweight composite forming step
S210: Primary trimming step
S220: Heating step
S230: Pressing process and secondary trimming step
S300: Carpet bonding step
S310: Carpet trimming step
S320: Glue forming step
S330: Press-bonding step
S340: Edge-wrapping step
10: Lightweight composite (or DLC material)
20: Vehicle seatback cover material
30: Carpet
50: Vehicle seatback cover
111: Reinforcing fiber hopper
113: Thermoplastic resin fiber hopper

The invention claimed is:

1. A manufacturing method of a vehicle seatback cover, comprising:
   a lightweight composite manufacturing step of manufacturing a lightweight composite using a reinforcing fiber and a thermoplastic resin fiber;
   a lightweight composite forming step of forming the lightweight composite into a vehicle seatback cover shape and preparing a vehicle seatback cover material; and
   a carpet bonding step of bonding the vehicle seatback cover material and a carpet material,
   wherein the lightweight composite manufacturing step includes:
     a fiber supplying step of supplying a reinforcing fiber and a thermoplastic resin fiber respectively;
     an opening step of opening the supplied reinforcing fiber and thermoplastic resin fiber;
     a mixing step of receiving and mixing the opened reinforcing fiber and thermoplastic resin fiber; and
     a carding step of evenly dispersing and carding the mixed lightweight composite material, and
   wherein the reinforcing fiber and the thermoplastic resin fiber are respectively supplied using a reinforcing fiber hopper and a thermoplastic resin fiber hopper in the fiber supplying step.

2. The manufacturing method of claim 1, wherein the lightweight composite includes a dry laid composite (DLC) material.

3. The manufacturing method of claim 1, wherein the lightweight composite uses maleic anhydride modified polypropylene (MAPP) as a raw material.

4. The manufacturing method of claim 1, wherein the lightweight composite has a Shore A Hardness of 89 to 92.

5. The manufacturing method of claim 1, wherein the lightweight composite has a flexural strength of 3.8 to 6.2, and a flexural modulus of 1430 to 2600.

6. The manufacturing method of claim 1, wherein the lightweight composite manufacturing step further includes
   a cross-lapping step of cross-lapping the carded lightweight composite material, while removing directionality of the carded lightweight composite material, and further stacking a nonwoven scrim on one side of the cross-lapped lightweight composite material, after the carding step.

7. The manufacturing method of claim 6, wherein the lightweight composite manufacturing step further includes
   a needle-punching step of needle-punching the cross-lapped lightweight composite material after the cross-lapping step.

8. The manufacturing method of claim 7, wherein the lightweight composite manufacturing step further includes:
   a slitting step of cutting the needle-punched lightweight composite material into a predetermined shape and size after the needle-punching step; and
   a laminating step of laminating the lightweight composite material cut into the predetermined shape and size and providing the lightweight composite having a predetermined thickness.

9. The manufacturing method of claim 3, wherein the lightweight composite forming step includes
   primarily trimming the lightweight composite into a predetermined size and shape;
   heating the primarily trimmed lightweight composite at a predetermined temperature;
   pressing and secondarily trimming the heated lightweight composite, forming the same into the vehicle seatback cover shape and providing the vehicle seatback cover material.

10. The manufacturing method of claim 3, wherein the carpet bonding step includes
    preparing a carpet material and trimming the carpet material into a shape and size of a vehicle seatback cover;
    forming a glue on the trimmed carpet material; and
    press-bonding the carpet material and the vehicle seatback cover material using the glue.

11. The manufacturing method of claim 9, wherein the carpet bonding step further includes
edgerapping an edge of the vehicle seatback cover using a remaining portion of an outer side of the carpet material bonded to the vehicle seatback cover material.

\* \* \* \* \*